United States Patent [19]

Wakeling

[11] Patent Number: 5,007,395

[45] Date of Patent: Apr. 16, 1991

[54] THROTTLE VALVE FOR AN INTERNAL COMBUSTION ENGINE

[75] Inventor: Robert Wakeling, Feering, England

[73] Assignee: Ford Motor Company, Dearborn, Mich.

[21] Appl. No.: 340,721

[22] PCT Filed: Jul. 7, 1988

[86] PCT No.: PCT/GB88/536

§ 371 Date: Mar. 9, 1989

§ 102(e) Date: Mar. 9, 1989

[87] PCT Pub. No.: WO89/00639

PCT Pub Date: Jan. 26, 1989

[30] Foreign Application Priority Data

Jul. 10, 1987 [GB] United Kingdom ................ 8716352

[51] Int. Cl.[5] ........................ F02D 9/18; F02M 9/10; F16K 31/126

[52] U.S. Cl. .................................. 123/337; 251/61.1; 137/599.1; 261/44.9

[58] Field of Search ................ 123/337; 261/44.9, 65; 137/219, 599.1; 251/61.1

[56] References Cited

U.S. PATENT DOCUMENTS

| | | | |
|---|---|---|---|
| 2,065,334 | 12/1936 | Koppe | 261/18 |
| 2,608,204 | 8/1952 | Dunn | 137/219 |
| 3,522,926 | 8/1970 | Bryant et al. | 251/61.1 |
| 3,690,344 | 9/1972 | Brumm | 251/61.1 |
| 3,942,756 | 3/1976 | Brumm et al. | 251/61.1 |
| 4,096,211 | 6/1978 | Rameau | 261/44.9 |
| 4,313,462 | 2/1982 | Adamson | 251/61.1 |
| 4,412,554 | 11/1983 | Chow | 251/61.1 |
| 4,538,570 | 9/1985 | Lunt | 123/337 |
| 4,824,072 | 4/1989 | Zakai | 251/61.1 |

FOREIGN PATENT DOCUMENTS

| | | |
|---|---|---|
| 1119047 | 12/1961 | Fed. Rep. of Germany . |
| 147962 | 6/1988 | Japan . |
| 565538 | 2/1946 | United Kingdom . |

*Primary Examiner*—Tony M. Argenbright
*Assistant Examiner*—Robert E. Mates
*Attorney, Agent, or Firm*—Jerome R. Drouillard; Clifford L. Sadler

[57] ABSTRACT

A throttle valve for an internal combustion engine in which a flow path is defined between a central core and a tube having a resiliently flexible wall, which tube separates the flow path from an adjacent working fluid chamber, whereby changes in the pressure within the chamber cause deformation to the tube wall resulting in changes in the tube cross-section between a wide open throttle position and a valve closed position, the flexible wall tube being designed to take up a valve closed position when the pressures on its opposite sides are equal, with the flexible wall tube being uniformly cylindrical in its relaxed state.

2 Claims, 1 Drawing Sheet

THROTTLE VALVE FOR AN INTERNAL COMBUSTION ENGINE

Figure 1:
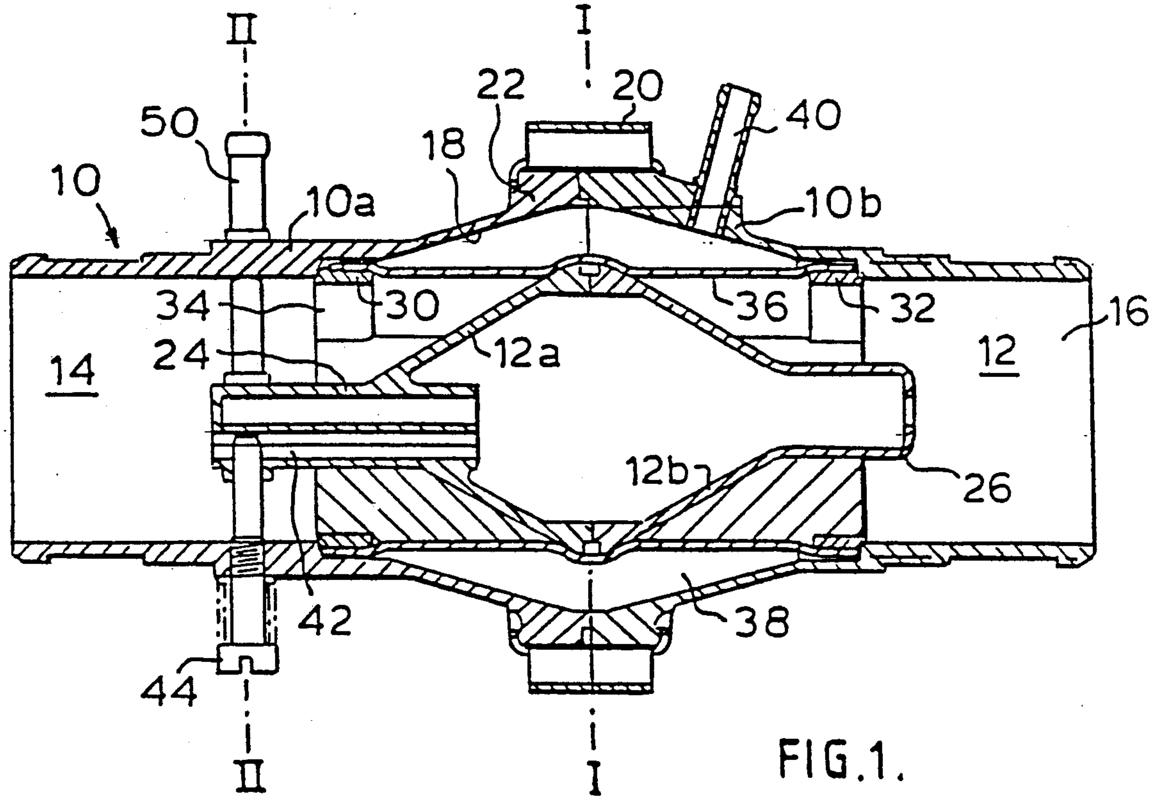

The invention is concerned with a throttle valve for an internal combustion engine in which a flow path is defined between a central core and a tube having a resiliently flexible wall, which tube separates the flow path from an adjacent working fluid chamber, whereby changes in the pressure within the chamber cause deformation of the tube wall resulting in changes in the tube cross-section between a wide open throttle position and a valve closed position, the flexible walled tube being designed to take up a valve closed position when the pressures on its opposite sides are equal.

Such a throttle valve is described in European Patent Application EP-A-0 127 251 and will herein be termed a venturi throttle valve on account of the venturi flow created in the annular gap between the core and the resilient tube. The importance of the venturi flow is that it remains laminar and this is in contrast with normal throttle design in which turbulence is induced in order to assist in the atomisation and mixing of the fuel. Because the flow is laminar, the problems of a wet manifold are reduced and higher air velocities can be attained.

EP-A- 0 127 251 describes a venturi throttle valve in which the flexible tube in its relaxed state, that is to say when there is no pressure difference across it, adopts an hour glass configuration to seal against the centre core. However, the manufacture of such a tube gives rise to problems since it is difficult to achieve consistently and reliably a tube of the required dimensions and resilience.

With a view to mitigating the foregoing disadvantage of the prior art, the present invention provides a venturi throttle valve in which the flexible walled tube is uniformly cylindrical in its relaxed state.

Thus, in the present invention, the resilient tube which is used to seal against the central core in the minimum throttle position is not preformed into any particular shape, but is a cylinder of constant diameter and thickness so that the increased throttle opening achieved when vacuum is applied to the surrounding working chamber is repeatable and predictable.

A search has revealed the existence of certain fluid control valves using a flexible tube as a closure member in which the tube, in its relaxed state, is uniformly cylindrical. Examples of such control valves are to be found in GB 583,535 and GB 565,538. These are, however, large control valves for use in industrial applications which cannot be used to regulate the air supply to an engine cylinder. Furthermore, they are not venturi throttle valves since flow through them is not laminar. On the contrary, in the case of these valves, the fluid flow is divided into streams by being passed through a slotted member which tends to introduce turbulence.

In EP-A-0 127 251 mentioned above, the central core serves no useful purpose other that than as an abutment surface against which the resilient tube may effect a seal.

In accordance with a preferred embodiment of the present invention, the central core of the venturi throttle valve includes means for introducing fuel into the air stream flowing in the annular gap between the core and the surrounding resilient tube.

The means for introducing fuel into the air stream may conveniently be fuel metering jets.

As the gap between the resilient tube and the core may not be uniform about the circumference of the core, it is preferred to provide several metering jets distributed about the circumference of the core. This will automatically compensate for any lack of uniformity in the resilient tube without adversely affecting the accuracy of the fuel metering. The metering jets may conveniently be located at the widest part of the core to provide the maximum venturi vacuum and optimum atomization of the aspirated fuel.

It is alternatively possible for the means for introducing fuel into the air stream to be the fuel injection nozzles of a fuel injection system.

Conveniently, the central core includes a by-pass passage to supply air when the engine is idling thus avoiding the need for an external by-pass under all circumstances. The by-pass passage may, if required, be separately fuelled through an idling jet.

It is an important advantage of the invention that throughout the operating range of the throttle the flow is axial so that losses due to friction are minimised. It is also preferred to provide one throttle per engine cylinder mounted in the immediate vicinity of the intake port for that cylinder so that pumping losses may be reduced.

Advantageously, the throttles are controlled by a negative feedback servo-control loop comparing the desired position of the flexible tube as determined by the position of the accelerator pedal and the actual position of the flexible tube as determined for example by measurement of the air flow gap.

In order to sense the size of the gap between the core and the flexible tube, it is possible to form the housing of the working chamber surrounding the resilient tube of two separable halves each coated with an electrically conductive material to form two plates of a capacitor including in its dielectric the flexible tube and the surrounding air gap. As the position of the flexible tube varies so will the capacitance and if measured this can indicate the actual flow rate.

It is a desirable feature of the invention that because the resilient tube is formed as a cylinder in its relaxed state it will tend to close any slit which may have developed in it due to wear or damage so that the tube fails into a safe position in which no air is allowed to pass through to the engine cylinder.

It is particularly preferred to manufacture the parts of the throttle valve other than the resilient tube from injection moulded plastics material as this allows the manufacturing costs to be reduced to the extent necessary to make it economically viable to provide one throttle valve per engine cylinder.

In order to provide a tuned manifold, plastics piping may be used connect the intake side of the throttle to a plenum chamber and in the conventional manner an air cleaner may be provided upstream of the plenum chamber to remove dirt from the incoming air.

If the throttle valves are arranged in the vicinity of the engine intake ports, they will be subjected to fairly elevated temperatures and it is important that the resilient tube should be made from a rubber or other elastomeric material capable of withstanding high temperature. There are currently available suitable materials capable of withstanding temperatures in the region of 140° C.

Figure 2:
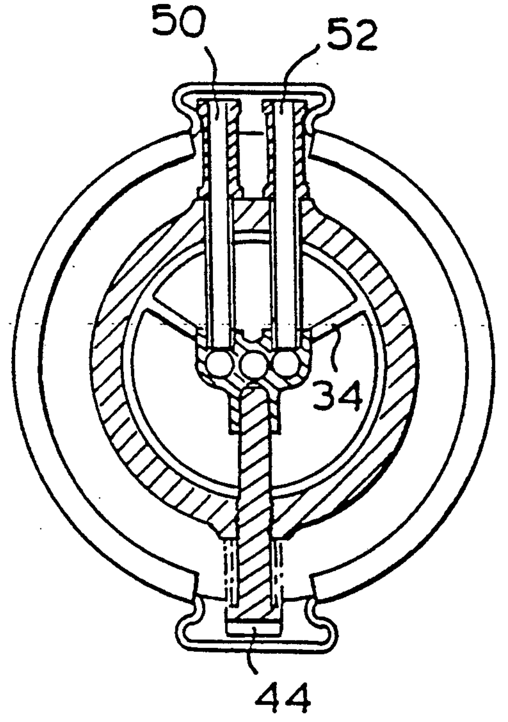

The invention will now be described further, by way of example, with reference to the accompanying drawings, in which:

FIG. 1 is a section taken through the longitudinal axis of a venturi throttle valve of the invention, and FIG. 2 is a section taken along the plane II—II in FIG. 1.

The venturi throttle shown in the drawings comprises an outer body 10 and a core 12 each of which is assembled from two parts. The parts 10*a*, 10*b* and 12*a*, 12*b* are joined to one another along the plane designated I—I in FIG. 1 and held in position by means of spring clips 20 gripping annular flanges 22 projecting from the parts 10, 10*b*. The individual parts may be machined from a solid but are preferably cast or moulded in order to reduce manufacturing costs.

The outer body 10 has cylindrical inlet and outlet passages 14 and 16 and a central enlarged diameter section 18 which is at its widest at the separation plane I—I and tapers generally conically away from this plane in both directions.

The core 12 has a central portion which is of small diameter at its ends 24 and 26 and has a significantly enlarged diameter at its centre. The core 12 is positioned within the outer body 10 by means of rings 30 and 32 which are connected to the central portion of the core by means of radial spokes 34. An elastic tube 36, which in its normal state is of constant diameter and thickness, is gripped between the rings 30, 32 and the inner surface of the outer body 10. The tube 36 is slightly stretched to fit over the central large diameter portion of the core 12 and thus seals against the outer body 10 at its ends and against the core 12 near its midpoint.

The space between the tube 36 and the core 12 forms a throttle aperture for regulating the air flow to an engine cylinder. The space 38 between the tube 36 and the outer body 10, on the other hand, forms a control chamber that is connected to a pressure medium supply through a connector 40. By varying the pressure in the control chamber 38 the through-flow cross section of the venturi throttle can be varied If the pressure medium is air, then the low pressure supply is a vacuum supply but it is alternatively possible to regulate the throttle cross section by pumping a liquid into and out of the control chamber 38.

The central portion of the core 10 is hollow and has a through passage 42 fitted with a control screw 44. Under idling conditions, the tube 36 seals against the core 12 and all the air reaching the engine cylinder passes through the passage 42. The screw 44 is an idle control screw to regulate the idling speed. The throttle need not therefore be provided with an external by-pass Two additional connectors 50 and 52 afford access to the space within the core 12. These connectors permit fuel to be introduced into the core and permit wires to pass out of the core 12 for the purposes to be described below.

The throttle can be used not only to vary the through-flow cross section for the air flowing to any cylinder or cylinders but can also serve to supply fuel to the engine. The fuel may be injected into the air stream using injection nozzles of a fuel injection system or may be naturally aspirated through metering jets.

It is preferred to provide several jets distributed about the periphery of the core 12 at its widest point and to control the mixture at idling by a separate jet. The provision of several metering jets connected to the fuel supply permits any unevenness in the cross section to be averaged out and positioning the metering jets within the region of maximum air velocity and therefore maximum venturi vacuum improves aspiration.

As all the air flow during idling passes through the passage 42, a further idling jet (not shown) is used to introduce fuel into the passage to provide a mixture of the required strength at idling.

The conically tapered inner surfaces of the outer body 10 may be plated with an electrically conductive material which provides a means for capacitatively measuring the extent of deformation of the flexible tube 36. However, instead of sensing the position of the throttle, it is preferred to measure air mass directly, such as by the use of a hot wire anemometer.

In a multi-cylinder engine, it is preferred that there should be provided one throttle per engine cylinder. The throttles are advantageously to be mounted as close as possible to the engine cylinders in order to minimise pumping losses.

To regulate the pressure in the control chamber 38, the connector 40 may lead to a valve under microprocessor control. The actual air flow mass is compared in the microprocessor with the desired mass and the valve is controlled so as either to maintain the existing position of the flexible tube by isolating the control chamber, or to vary the throttle cross section by connecting the control chamber to vacuum (wider throttle aperture) or to atmosphere (smaller throttle aperture). The microprocessor can be provided with signals indicative of the air mass flowing to each individual cylinder and this permits improved control of the combustion quality enabling lower emissions, improved fuel economy and engine smoothness. The mixture and air mass control are furthermore controlled electronically and different control strategies and calibrations may be implemented by replacement of the control circuit alone.

If, during operation, the elastomeric material of the tube 36 should split, then the pressure maintaining the throttle open will be lost and the tube 36 will fail in a safe closed throttle position.

Virtually the entire throttle body can be made from a plastics material and in addition to the advantages described above the invention permits the costs of the throttles and fuelling system of an engine to be reduced significantly. Plastics are available that will withstand the temperature in the immediate vicinity of the engine block and elastomeric materials are also available for the tube 36 that function within this environment.

Costs are further reduced by the fact that each engine does not require a dedicated carburettor and the same venturi throttle valve can be used on a variety of engines with modification only to the electronic circuitry controlling the fuelling.

I claim:

1. A throttle valve for an internal combustion engine in which a flow path is defined between a central core (12) including a by-pass passage (42) to supply air when the engine is idling, and a tube (36) having a resiliently flexible wall, which tube (36) separates the flow path from an adjacent working fluid chamber (38), whereby changes in the pressure within the chamber (38) cause deformation of the tube wall resulting in changes in the tube cross-section between a wide open throttle position and a valve closed position, the flexible walled tube (36) being designed to take up a valve closed position when the pressures on its opposite sides are equal, characterised in that the flexible walled tube (36) is uniformly cylindrical in its relaxed state.

2. A multi-cylinder internal combustion engine, having a respective throttle valve as claimed in claim 1 for regulating the air supply to each cylinder and mounted in the vicinity of the intake port of the associated cylinder.

* * * * *